United States Patent [19]
Wemhoff

[11] Patent Number: 4,465,593
[45] Date of Patent: Aug. 14, 1984

[54] RECOVERY OF METAL FROM WASTE WATER BY CHEMICAL PRECIPITATION

[75] Inventor: Mark F. Wemhoff, Enterprise, Fla.

[73] Assignee: Environmental Technology (U.S.), Inc., Orlando, Fla.

[21] Appl. No.: 566,606

[22] Filed: Dec. 29, 1983

Related U.S. Application Data

[63] Continuation-in-part of Ser. No. 360,924, Mar. 23, 1982, abandoned.

[51] Int. Cl.$^3$ ............................................. C02F 1/56
[52] U.S. Cl. .................................. 210/96.1; 210/104; 210/108; 210/195.1; 210/196; 210/203; 210/204; 210/206
[58] Field of Search ............... 210/710, 711, 712, 715, 210/772, 96.1, 97, 106, 103, 107, 104, 108, 194, 210/195.1, 196, 201, 202, 203, 204, 206, 207, 208; 422/62; 423/150

[56] References Cited

U.S. PATENT DOCUMENTS

| | | | |
|---|---|---|---|
| 3,740,331 | 6/1973 | Anderson et al. | 210/53 |
| 3,983,017 | 9/1976 | Szabo | 423/150 |
| 3,984,529 | 10/1976 | Tung | 55/73 |
| 4,040,954 | 8/1977 | Chandler | 210/96.1 |
| 4,102,784 | 7/1978 | Schlauch | 210/47 |
| 4,113,619 | 9/1978 | Arrington | 210/96.1 |
| 4,116,832 | 9/1978 | Tardivel | 210/96.1 |
| 4,116,834 | 9/1978 | King | 210/96.1 |
| 4,151,080 | 4/1979 | Zuckerman | 210/96.1 |
| 4,170,553 | 10/1979 | Lang | 210/96.1 |
| 4,217,209 | 8/1980 | Steffan et al. | 210/53 |
| 4,224,148 | 9/1980 | Lindman | 210/724 |
| 4,329,224 | 5/1982 | Kim | 210/709 |

OTHER PUBLICATIONS

Robert L. LaPerle, "Removal of Metals from Photographis Effluent by Sodium Sulfide Precipitation", Journal of Applied Photographic Engineering, No. 3, vol. 2, 1976.
R. E. Wing and W. E. Rayford, "Heavy Metal Removal Using Dithiocarbamates", pp. 67–71, Jan. 1982.
M. B. Yeligar et al., "Treatment of Metal Finishing Wastes by Use of Ferrous Sulfide", U.S. Environmental Protection Agency Project Summary, Sep. 1981.
B. M. Kim, "Treatment of Metal Containing Wastewater with Calcium Sulfide", General Electric Company, reprinted from AIChE Symposium Series, No. 209, vol. 77, pp. 39–48.
Alan K. Robinson et al., "Sulfide Precipitation of Heavy Metals", U.S. Environmental Protection Agency, EPA-600/2-80-139, Jun. 1980, pp. 1–106.
Owner's Guide, Hayward-Perflex Extended Cycle Filter, Model EC40-F.
Summary Report, "Control and Treatment Technology for the Metal Finishing Industry-Sulfide Precipitation", U.S. Environmental Protection Agency, EPA 625/8-80-003, Apr. 1980.

Primary Examiner—Ernest G. Therkorn
Attorney, Agent, or Firm—Woodcock Washburn Kurtz Mackiewicz & Norris

[57] ABSTRACT

Metals are removed from waste water by chemical precipitation and filtration. The system is controlled by a control system responsive to an ion specific electrode and a pH responsive electrode in a manifold that recycles filtrate to a reaction tank where precipitation occurs.

13 Claims, 4 Drawing Figures

RECOVERY OF METAL FROM WASTE WATER BY CHEMICAL PRECIPITATION

This application is a continuation-in-part of application Ser. No. 360,924, filed Mar. 23, 1982, now abandoned.

The present invention relates, in general, to waste management and pollution control and, in particular, it relates to an apparatus for the recovery of metals from processing effluent.

BACKGROUND OF THE INVENTION

The Environmental Protection Agency has issued regulations prohibiting the discharge of metals in process waste water streams. Many industries producing metal bearing liquid effluents simply do not comply with these regulations and illegally discharge untreated waste effluents into streams and sewers. The two major alternative methods for complying with metal discharge regulations by these industries are the storage and transport of untreated, unconcentrated wastes to hazardous waste disposal sites, or, alternatively, on-site treatment. Storage and transport of waste is very expensive for all but the very small volume waste producers.

On-site treatment is an effective means for ensuring compliance with disposal regulations. The most viable chemical techniques for on-site treatment of metal bearing effluents include electrolytic deposition, metallic replacement, ion exchange, chemical reduction and chemical precipitation. While, electrolytic deposition, metallic replacement, ion exchange and chemical reduction are all reasonably effective, chemical precipitation is believed to be the most effective method for metal removal from waste water effluents. Two main chemical precipitation methods are known for removing heavy metals from waste water—hydroxide precipitation and sulfide precipitation. Hydroxide precipitation has limitations, however, due to high solubility and amphoteric properties of metal hydroxides. In addition, the technique is not effective in the presence of chelating agents, which are commonly used in metal finishing operations. See, Treatment of Metal Containing Waste Water with Calcium Sulfide, AICHE Symposium Series No. 209, Vol. 77. Sulfide precipitation is an alternate method which does not have the shortcomings associated with hydroxide precipitation. Three major problems, however, exist with sulfide precipitation. These are the necessity to control excess sulfide ion; the necessity to control pH to avoid the production of toxic and noxious hydrogen sulfide gas and the problems associated with the filtration of the very fine metal sulfide particles.

Despite these problems, sulfide precipitation by manual and semi-automatic means has been shown to be a highly effective method of metal recovery from processing effluents. Nevertheless, the method has not been widely used due to certain hazards and complexities which render it commercially impractical. The sulfide precipitation method of metal recovery involves a sequence of dynamic chemical reactions and mechanical processes which, when under manual or semi-automatic control, require repeated intervention by an attentive operator. The interventions required by the operator require a significant degree of skill and training. Moreover, the varying methods of metal precipitation uniformly require some degree of exposure to strong chemical reagents, which by their caustic, explosive, or reactive nature may endanger the safety of the operator. In addition, sulfide precipitation methods now in use generally result in final sludge products of less than 10% solids which are difficult to handle, store and transport. Potential liberation of such material also presents an additional hazard due to the toxic or reactive nature of metallic or chemical components.

Chemical precipitation methods now in use also generally employ a chemical fume-hood or open venting system against the possible liberation of hydrogen sulfide, ammonia, or other gases from the process which may adversely affect exposed material, processes, and personnel.

While the sulfide precipitation method of metal removal and recovery has previously been subject to remote monitoring and/or semi-automatic control, no comprehensive control system is known with the capability to continuously stage, monitor and respond to all of the control aspects of the method, so as to render the method practical for commercial application. It would be desirable to provide an improved apparatus for recovery of unwanted metals from waste water effluents by chemical precipitation which is automatic and which, therefore, avoids the serious disadvantages referred to above.

In addition, chemical precipitation methods of metal recovery now typically employ either a settling system or a cartridge filter media for final removal of metal precipitates. These settling systems and cartridge filter media also suffer from serious disadvantages. Precipitate settling systems require large amounts of space and deliver flowable sludges as the final end product. Cartridge filter media now in use are too slow for commercial applications and require repeated replacement of the expensive cartridge filter media. It would be desirable to provide an automatic metal recovery apparatus as referred to above, which also avoids the serious disadvantages resulting from the use of settling system or cartridge filter media.

SUMMARY OF THE INVENTION

These and other objects of the present invention are achieved by means of a system for the chemical precipitation and removal of metals from waste water which includes a fill line and a reaction tank for receiving waste water from that fill line, the waste water having metals dissolved therein. The reaction tank receives precipitating reagent and pH balancing reagent. A filter means is coupled to the outlet of the reaction tank to receive liquid and precipitated metals therefrom. A manifold is provided for receiving the output from the filter means, the manifold being coupled between the output of the filter means and the inlet of the reaction tank. In this manner, liquid and precipint of the treated waste water provides an indication of when the precipitating reaction has been completed. The pH specific electrode is responsive to the pH of the waste water. The pH of the treated waste water is controlled within a preselected range to avoid the production of toxic and noxious gases. A first valve means controls the flow of filtrate through the manifold. A second valve means controls the flow of filtrate through a drain line which receives the fully treated effluent.

In accordance with an important aspect of the present invention a microprocessor control means is provided which is responsive to the ion specific and pH specific electrodes. The control means controls both the first and second valve means. Initially, the second valve means is closed which precludes flow of waste water through the drain line while the first valve means is opened thus permitting a recirculating flow through the manifold until the free specific ion content of the treated waste water changes to a predetermined value. Thereafter, the second valve means is opened to permit flow of waste water through the drain line while the first valve means is closed to preclude flow through the manifold. In this manner, the control means of the present invention recirculates treated waste water through the reaction tank and the filter means until such time as the final dischargeable filtrate meets a predetermined output metal concentration. It has been found that recirculation of the waste water for multiple passes through the filter means reduces output metal concentration to levels previously thought unattainable.

In accordance with another important aspect of the present invention the filter means includes a diatomaceous earth filter which has proven to be particularly desirable in the present application. Moreover, means are provided which are responsive to the control means for automatically washing the diatomaceous filter means to prevent caking of sludge on the filter means.

In accordance with still another important aspect of the present invention, the precipitating reagent utilized in the reaction tank mentioned above includes sodium sulfide, a sulfur containing precipitant such as, but not limited to thioacetamide or a soluble dithiocarbamate salt. In accordance with still another important aspect of the present invention, a flocculating polymer may be added to any of these precipitating reagents for improving filtration efficiency.

BRIEF DESCRIPTION OF THE DRAWINGS

These and other aspects of the present invention will be more fully understood by reference to the accompanying drawings, in which.

DETAILED DESCRIPTION OF THE PRESENT INVENTION

The system of the present invention for removing metals from waste water by chemical precipitation includes a plurality of components including a main reaction tank, a filter means, sensors and a control means. As set forth in detail in the parent application to the present application, all of these components are situated in a cabinet having a control component space for the control means and remaining interior space for the remaining components. The system of the present invention is small and compact for ease of installation on-site.

Figure 1:
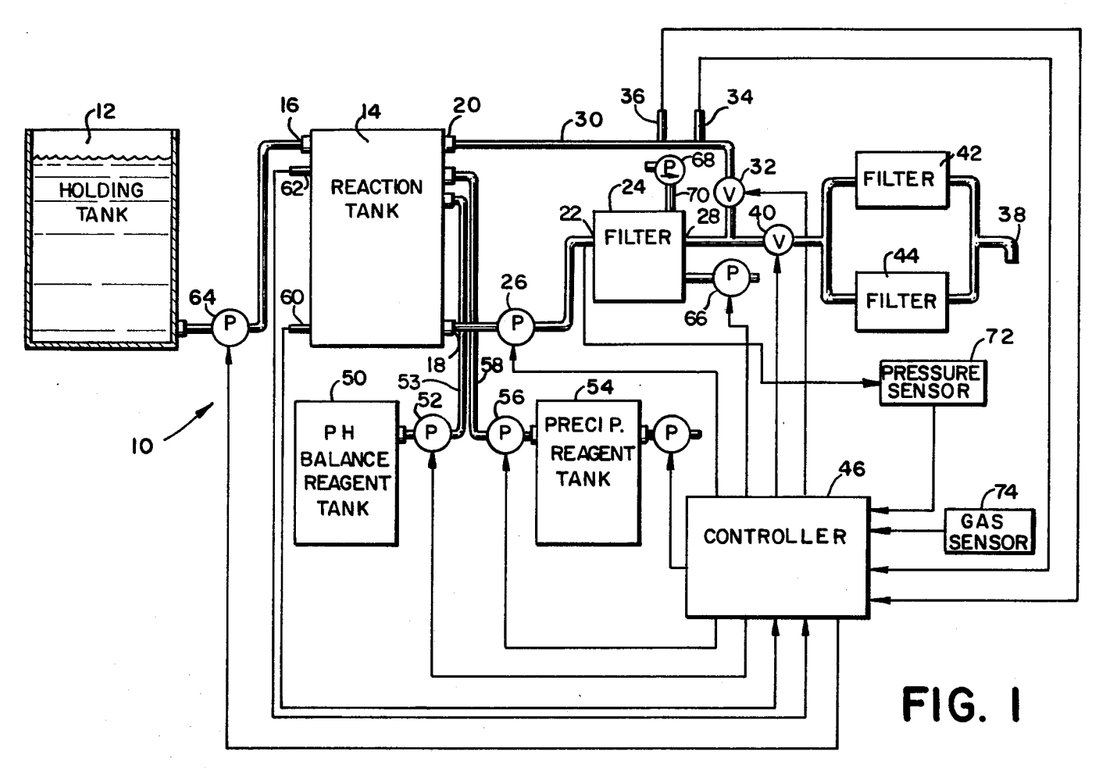
FIG. 1 is a schematic diagram of the system for chemical precipitation and removal of metals in accordance with the present invention.

The present invention will be more fully understood by reference to FIG. 1 of the accompanying drawings which schematically discloses the system 10 for the chemical precipitation and removal of metals from waste water. The system 10 preferably includes a holding tank 12 for storing untreated waste water, the waste water having metals dissolved therein. The system 10 processes the waste water in the holding tank 12 in a batch-wise operation. The system 10 includes a reaction tank shown at 14 which is connected by a fill line 16 to the holding tank 12. The reaction tank 14 receives waste water containing dissolved metals from the fill line 16. The reaction tank 14 includes an outlet 18 as well as an inlet shown generally at 20. The reaction tank, in addition to receiving waste water from the fill line 16, also receives precipitating reagent and pH balancing reagent in a manner to be further described below. The pH balancing reagent insures that the chemical reactions taking place in the reaction tank 14 are maintained within a predetermined pH range so as to preclude the generation of toxic gases. Waste water from the outlet 18 of the reaction tank 14 is directed via a conduit 22 to a filter means shown generally at 24. In accordance with an important aspect of the present invention the filter means 24 comprises a diatomaceous earth filter. Waste water from the reaction tank 14 is circulated through the filter means 24 by means of a first fluid circulation means or main system pump 26 situated at an intermediate portion of the conduit 22.

In accordance with another important aspect of the present invention, the output 28 of the filter means 24 is connected via a manifold 30 to the inlet 20 of the reaction tank 14. Still further in accordance with an important aspect of the present invention, the manifold 30 includes a first valve means 32 for controlling the flow of waste water through the manifold 30. The manifold 30 also includes an ion specific electrode 34 which is responsive to the free ion content of the waste water. The manifold 30 still further includes a pH specific electrode 36 which is responsive to the pH of the waste water. As will be more fully explained below, the ion specific electrode 34 is utilized to determine when the precipitation process carried on in the reaction tank 14 has been completed. The pH specific electrode 36 is utilized to control the pH of the waste water so as to preclude the generation of toxic and noxious gas such as hydrogen sulfide.

Also coupled to the output 28 of the filter means 24, in addition to the manifold 30, is a drain line shown generally at 38. A second valve means 40 is situated in the drain line 38 to control the flow of fluid therein. Situated within the drain line 38 is a polishing filter means. In the embodiment shown in FIG. 1, two polishing filters 42 and 44 are shown, each connected in parallel with the other.

Finally, the system 10 for chemical precipitation and removal of metals from waste water shown in FIG. 1 includes a control means or microprocessor controller shown generally at 46. The microprocessor controller 46 controls the first and second solenoid valve means 32 and 40. Moreover, the controller 46 is responsive to the ion specific electrode 34 and to the pH specific electrode 36. In accordance with an important aspect of the present invention, the control means 46 initially controls the second valve means 40 to be situated in a closed position, thereby precluding the flow of waste water through the drain line 38 and through the polishing filters 42 and 44. The control means 46 further initially controls the first valve means 32 such that it is in an open position so as to initially permit recirculation of treated waste water from the output 28 of filter means 24 through the manifold 30 to the reaction tank 14. When the free ion content of the treated waste water passing through the manifold 30 increases by a predetermined amount as determined by the ion specific electrode 34, the control means 46 is effective to close the first valve means 32 and to open the second valve means 40 thereby passing the effluent from the filter means 24 through the polishing filter 42 and 44 to the drain line 38.

Recirculation of the treated waste water from the filter means 24 (such that multiple passes of that treated waste water are made therethrough) results in greatly improved removal of metal precipitates from the resulting effluent. For example, in one experiment utilizing a diatomaceous earth filter copper was removed from waste water using a sodium sulfide precipitating reagent. Initially, the waste water contained approximately 3.6 mg/l copper. Table I below indicates the copper level of the effluent from the filter following repeated passes through it.

TABLE I

| Number of Passes | Copper Level |
|---|---|
| 1. | 1.4 mg/l |
| 2. | 0.6 mg/l |
| 3. | 0.28 mg/l |
| 4. | 0.17 mg/l |

Referring again to FIG. 1, still other important aspects of the present invention will be described. As shown in FIG. 1, the system 10 of the present invention also includes a pH balancing reagent tank 50. A first fluid supply means or pump 52 is provided which is coupled to the pH balancing reagent tank 50 and to the reaction tank 14 by a line 53. The pump 52 is responsive to the control means 46 such that pH balancing reagent may be directed from the pH balancing reagent tank 52 to reaction tank 14 whenever the pH of the waste water from the filter means 24 is outside a predetermined range as detected by the pH specific electrode 36. Also provided is a precipitating reagent tank 54 containing precipitating reagent to be added to the reaction tank 14. A second fluid supply means or pump 56 is provided for adding precipitating reagent from the precipitating reagent tank 54 through a line 58 to the reaction tank 14. The pump 56 operates under the control of the control means 46 for adding precipitating reagent to the reaction tank whenever the free specific ion content of the water water from the filter means 24 is outside predetermined limits as detected by the ion specific electrode 34.

Dithiocarbamates are the preferred precipitating reagents for use in the present invention. These materials, though more expensive than sodium sulfide, nonetheless possess some unique advantages over sodium sulfide as a precipitant. Among these advantages are the fact that dithiocarbamates are useable over a wider pH range than sodium sulfides without the danger of hydrogen sulfide generation. Moreover, dithiocarbamates are believed to produce a more stable sludge with lower toxicity than sludge produced with sodium sulfide precipitating reagent. It has been found that the ion specific electrode 34 of the present invention, though designed to respond to excess sulfide ion, responds as well to dithiocarbamates.

While not necessary to the practice of the present invention it has been found that the precipitating reagent contained in the precipitating reagent tank may also include a flocculating polymer such as a polyelectrolyte which aids in the filtration efficiency of the filter means 24.

In accordance with still another aspect of the present invention the system 10 may also include level detecting means or sensors shown at 60 and 62 respectively. These level sensing means 60 and 62 project through the walls of the reaction tank 14 so as to detect the liquid level of the contents of the reaction tank. The control means 46 is responsive to the liquid level as detected by the level detectors 60 and 62. Moreover a fourth fluid supply means or pump 64 is provided in the fill line 16. The pump 64 is responsive to the control means 46 so as to transfer waste water to be treated from the holding tank 12 to the reaction tank 14 whenever the liquid level detector 60 indicate that the reaction tank 14 is substantially empty. The pump 64 is deactivated whenever the reaction tank 14 is substantially filled as detected by the level detector means 62.

In accordance with still another important aspect of the present invention, a fourth fluid supply means or pump 66 is provided for washing the filter means 24 with water to prevent the caking of sludge or the filter. The pump 66, like the other pumps described above is responsive to the control means 46 for periodically washing the filter means 24 as required. The washing mechanism preferably is accomplished after each filtration cycle. Moreover, in accordance with the preferred embodiment, an air pump 68 is provided which is coupled to the filter means 24 by a line 70. The air pump 68 is also controlled by controller 46. Air is pumped to the filter means 24 simultaneously with water from the pump 66 to aid in sludge removal and filter washing.

Still further in accordance with the system of FIG. 1, a pressure sensor 72 is provided. The pressure sensor 72 detects the input pressure to the filter means 24. When the pressure of the waste water exceeds a predetermined minimum, the controller 46 initiates washing of the filter means.

Still further in accordance with the system of FIG. 1, a gas sensor 74 is provided. The controller 46 is responsive to the sensor output to shut off the system 10 if excess hydrogen sulfide gas is produced.

Numerous advantages are achieved by the system 10 shown is FIG. 1. One such advantage resides in the fact that the ion specific and pH specific electrodes 34 and 36 are responsive to the condition of the waste water exiting from the output 28 of the filter means 24. It has been found that by so situating the electrodes 34 and 36 these electrodes are substantially precluded from fouling which occurs when the electrodes are located in the conduit 22. Moreover, in the system 10 shown in FIG. 1, the control means 46 provides for automatic operation such that the final effluent in the drain line 38 has extremely low dissolved metal concentrations without the generation of toxic or noxious gases and without any substantial operator assistance.

Figure 2A:
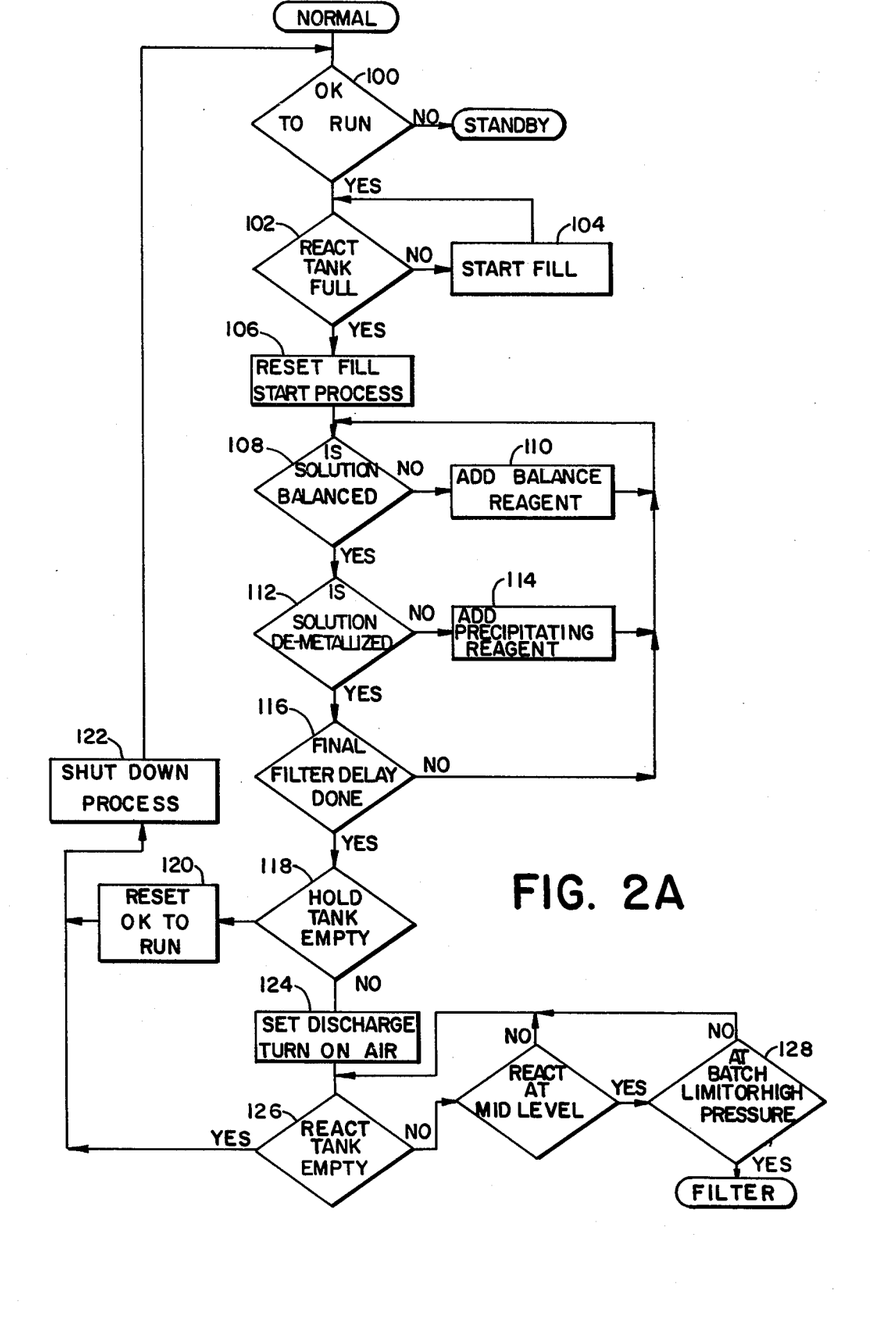
FIGS. 2a-2c are flowcharts illustrating the operation of the microprocessor controller of FIG. 1.
Figure 2B:
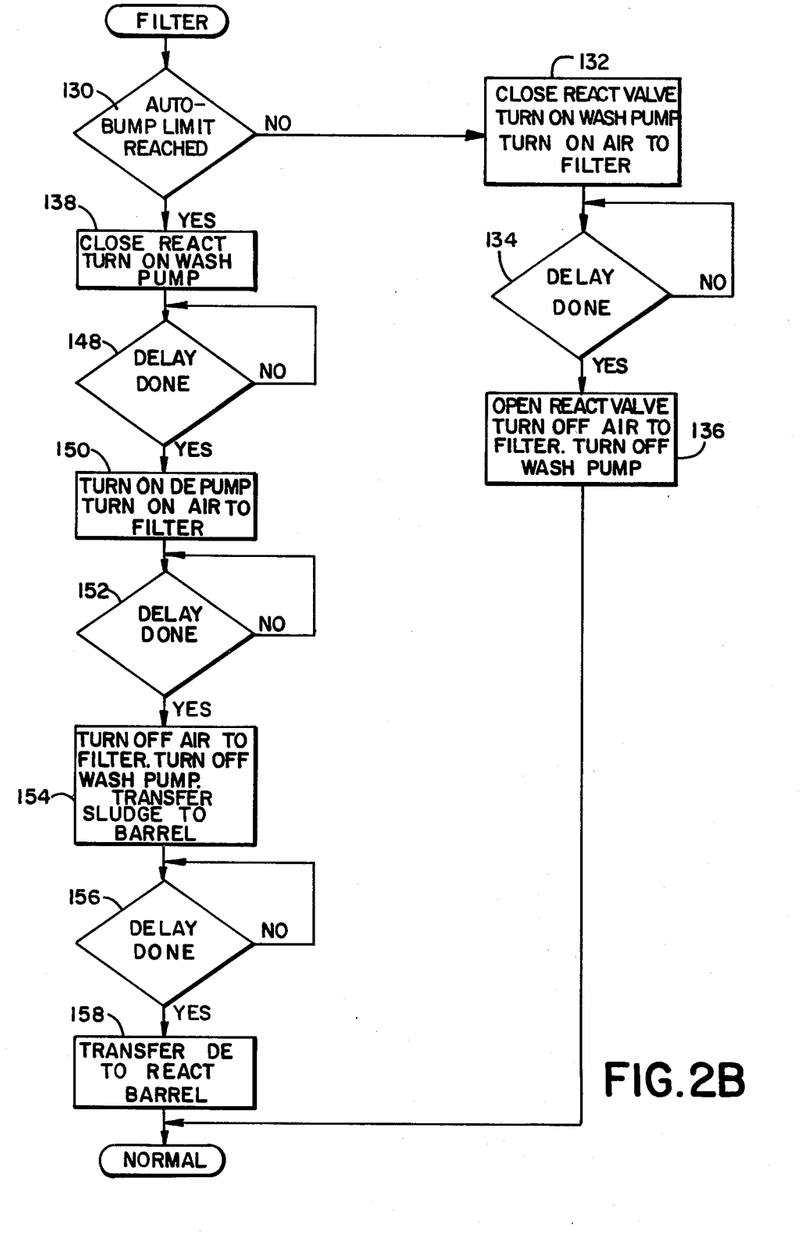
Figure 2C:
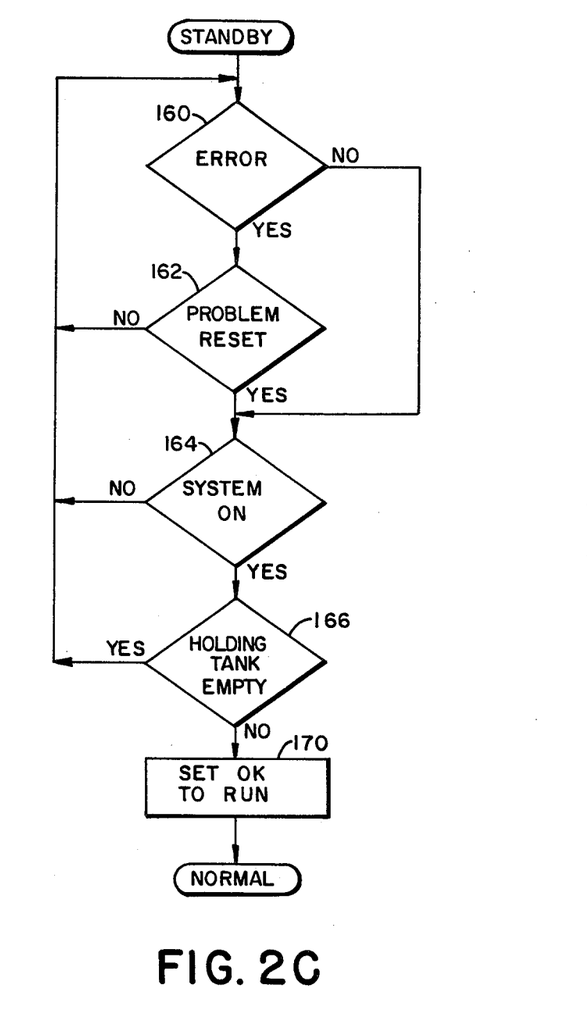

Referring now to FIGS. 2a-2c, the logic employed by the microprocessor-controller 46 will be described in detail.

FIG. 2a illustrates the operation of the microprocessor when the system 10 is in a normal operating mode. FIG. 2b illustrates the operation of the filter cleaning mode and FIG. 2c illustrates the standby mode.

As shown in FIG. 2a at decision block 100, the microprocessor first determines whether the system 10 is in an operative mode. If the system is set to operate, the microprocessor 46 advances to decision block 102 to determine whether the reaction tank 14 is filled. This determination is made on the basis of information received from the level detectors 60 and 62 mentioned above. If the reaction tank 14 is not filled, the microprocessor 46 causes the pump 64 to begin transferring waste water from the holding tank 12 to the reaction tank 14 as indicated by the start fill block 104. When the reaction tank 14 has been filled, the treating process of the present invention begins with the activation of the main system pump 26, as indicated in block 106. First, as shown at block 108, the microprocessor-controller 46 determines whether the waste water in the reaction tank 14 is pH balanced, as determined by the pH sensitive electrode 36. If the waste water is not in pH balance, pH balancing reagent is transferred from the pH balancing reagent tank 50 to the reaction tank 14 by pump 52 as indicated in block 110. If the waste water is within the pH balance limits, the microprocessor controller 46 next determines at block 112 whether metals have been sufficiently precipitated from the waste water in the reaction tank 14. If not, precipitating reagent from the precipitating reagent tank 54 is directed to the reaction tank 14 by pump 56 as indicated in block 114.

Next, the microprocessor determines whether final filtering has been completed as indicated in decision block 116. If the final filtering has been completed, it is next determined whether the holding tank 12 is empty, as shown in decision block 118. If the holding tank is empty, the system 10 is reset as shown in decision block 120 and the main system pump 26 is stopped as shown in block 122.

If the holding tank 12 is not empty and another batch of waste water is to be treated, the microprocessor 46 opens the valve 40 and begins discharge through the drain line 38 as indicated in block 124. Also, at the same time, the microprocessor controller 46 inserts air from the air pump 68 to the filter means 24 to aid in oxidizing excess sulfides.

Next, the microprocessor 46 determines whether the reaction tank 14 is empty or not in decision block 126. If the reaction tank 14 is empty, the main system pump 26 is shut off and the system readies itself to process the next batch of waste water. If the reaction tank 14 is not empty, the microprocessor 46 determines whether maintenance of the filter means is required. Maintenance is required if a predetermined number of batches have been filtered or alternatively, if a high pressure situation has been detected by the pressure sensor 72 indicating a need to clean the filter means 24 (as indicated in decision block 128).

FIG. 2b illustrates the operations undertaken if filter maintenance is required. If maintenance of the filter means 24 is required, the system 10 can operate in one of two modes. In the first mode, the diatomaceous earth filter is subjected to a treatment including the injection of both air and water to the filter to increase the filtration efficiency. In a second mode, the sludge laden diatomaceous earth is removed and new diatomaceous earth is added. As indicated at decision block 132, the control means 46 selects between these two modes by first determining whether a predetermined number of cycles through the filter 24 have been made. If less than the number of cycles have been made, the filter means 24 is cleaned without the replacement of diatomaceous earth. In this circumstance, as indicated at decision block 132, the valve 32 is closed and the wash pump 66 and air pump 68 are turned on. After a predetermined time delay indicated by decision block 134, the valve 32 is reopened and pumps 66 and 68 are turned off such that the system 10 may be recycled.

If the second filter maintenance mode is selected at decision block 132, the valve 32 is closed and the wash pump 66 is turned on for a predetermined period of time as indicated by blocks 138 and 140. Thereafter, a diatomaceous earth pump (not shown) begins to pump new diatomaceous earth to the reaction tank 14. At the same time, air from pump 68 is caused to flow to the filter means 24 as indicated at block 150. The diatomaceous earth and air are added for a predetermined time period indicated by delay block 152. Thereafter, sludge is removed from the filter means through an exit port (not shown) as indicated at block 154. After a predetermined time delay shown at block 156, the diatomaceous earth which has been inserted to the reaction tank 14 is pumped by the main system pump 26 to the filter means 24 as shown at block 158.

Referring now to FIG. 2c, the stand-by mode of the system 10 will be illustrated. As shown in FIG. 2c, the microprocessor 46 first ascertains whether any faults or errors have been detected in decision block 160. If an error has been detected, the controller 46 determines whether the operator has corrected and reset the system as shown at block 162. If reset has occurred, or if no error has been detected, the microprocessor 46 determines whether the system has been turned on at block 164. If the system is on, but the holding tank 12 is empty as indicated in decision block 166, the microprocessor controller loops back to the error block 160 and remains in a stand-by mode. However, if the holding tank 12 is empty, the controller is in a normal mode as indicated by block 170 and the system 10 begins to operate as indicated in FIG. 2a above.

While a particular embodiment of the present invention have been shown and described it will, however, be recognized that other embodiments may occur to those skilled in the art and these embodiments are included within the spirit and scope of the appended claims.

What is claimed is:

1. A system for the chemical precipitation and removal of metals from waste water comprising:
   a fill line;
   a reaction tank for receiving waste water from said fill line, the waste water having metals dissolved therein, for receiving a sulfur containing precipitating reagent and for receiving a pH balancing reagent, said reaction tank having an inlet and an outlet;
   filter means coupled to said outlet for receiving liquid and precipitated metals from said reaction tank;
   a manifold for receiving waste water from said filter means, said manifold coupled between the output of said filter means and the inlet of said reaction tank, said manifold including:
      an ion specific electrode responsive to the free sulfur containing precipitant ion content of said waste water from said filter means;
      a pH specific electrode responsive to the pH of said waste water from said filter means; and
      a first valve means for controlling the flow of said waste water through said manifold;
   a drain line coupled to the output of said filter means for receiving fully treated filtrate;
   a second valve means for controlling the flow of filtrate through said drain line;
   a first fluid circulation means for causing the flow of waste water through said filter means and said manifold and of filtrate through said drain line; and
   control means for said first and said second valve means and responsive to said pH and to said ion specific electrodes, said second valve means precluding flow through said drain line and said first valve means permitting flow through said manifold until the free ion content changes to a predetermined value, and thereafter said second valve means permitting flow through said drain line and said first valve means precluding flow through said manifold.

2. The system of claim 1 wherein:

said first fluid circulation means is responsive to said control means whereby said waste water is recirculated through said filter means until said predetermined value is achieved and thereafter caused to flow through said drain line.

3. The system of claim 1 wherein said filter means comprises:

a diatomaceous earth filter.

4. The system of claim 1 further comprising:

a pH balancing reagent tank for receiving pH balancing reagent; and a first fluid supply means coupled to said pH balancing reagent tank, said first fluid supply means being responsive to said control means whereby pH balancing reagent is directed to said reaction tank whenever the pH of said waste water is outside a predetermined range as detected by said pH specific electrode.

5. The system of claim 1 further comprising:

a precipitating reagent tank; and a second fluid supply means coupled to said precipitating reagent tank, said second fluid supply means being responsive to said control means for directing precipitating reagent to said reaction tank whenever said free ion content is outside predetermined limits as detected by said ion specific electrode.

6. The system of claim 5 wherein said precipitating reagent comprises:

sodium sulfide.

7. The system of claim 5 wherein said precipitating reagent comprises:

dithiocarbamates.

8. The system of claim 5 wherein said precipitating reagent comprises thioacetamide.

9. The system of any of claims 6, 7 or 8 wherein said precipitating reagent further comprises a flocculating polymer.

10. The system of claim 8 wherein said flocculating polymer comprises a polyelectrolyte.

11. The system of claim 1 further comprising:

a means for determining the level of the contents of said reaction tank, said control means being responsive thereto;

a holding tank for storing untreated waste water until said reaction tank is substantially empty as detected by said determining means; and a third fluid supply means, responsive to said control means, for causing the flow of said waste water from said holding tank to said reaction tank when said reaction tank is substantially empty.

12. The system of claim 1 wherein said drain line further comprises:

polishing filter means for final treatment of said filtrate before discharge.

13. The system of claim 1 further comprising:

a fourth fluid supply means responsive to said control means for washing said filter means to prevent caking of sludge.

* * * * *

UNITED STATES PATENT AND TRADEMARK OFFICE
CERTIFICATE OF CORRECTION

PATENT NO.   :   4,465,593
DATED        :   August 14, 1984
INVENTOR(S)  :   Mark F. Wemhoff It is certified that error appears in the above-identified patent and that said Letters Patent is hereby corrected as shown below:

Column 2, line 54, delete "precipint" and insert the following:

--precipitated metals may be recirculated through the manifold, the reaction tank and the filter until such time as sufficient metal has been precipitated and filtered from the waste water and the treated effluent is suitable for discharge. Situated in the manifold are ion specific and pH specific electrodes. The ion specific electrode is responsive to the free heavy metal and sulfur containing precipitant ion content of the waste water from the filter means. The sulfur containing precipitant ion content --

Signed and Sealed this

Twenty-sixth Day of March 1985

[SEAL]

Attest:

DONALD J. QUIGG

Attesting Officer

Acting Commissioner of Patents and Trademarks